(12) United States Patent
Kasahara et al.

(10) Patent No.: US 11,933,714 B2
(45) Date of Patent: Mar. 19, 2024

(54) CALCULATION DEVICE, CALCULATION METHOD, AND PROGRAM

(71) Applicant: NIPPON TELEGRAPH AND TELEPHONE CORPORATION, Tokyo (JP)

(72) Inventors: Hisatoshi Kasahara, Musashino (JP); Tomoyasu Nagai, Musashino (JP); Norihiro Fujimoto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 678 days.

(21) Appl. No.: 16/972,606

(22) PCT Filed: May 8, 2019

(86) PCT No.: PCT/JP2019/018370
§ 371 (c)(1),
(2) Date: Dec. 7, 2020

(87) PCT Pub. No.: WO2019/239749
PCT Pub. Date: Dec. 19, 2019

(65) Prior Publication Data
US 2021/0239598 A1 Aug. 5, 2021

(30) Foreign Application Priority Data

Jun. 12, 2018 (JP) .................................. 2018-111991

(51) Int. Cl.
*G01N 17/00* (2006.01)
*G05D 23/19* (2006.01)

(52) U.S. Cl.
CPC ....... *G01N 17/002* (2013.01); *G05D 23/1917* (2013.01); *G05D 23/1919* (2013.01)

(58) Field of Classification Search
CPC ............ G01N 17/002; G05D 23/1917; G05D 23/1919
See application file for complete search history.

(56) References Cited

U.S. PATENT DOCUMENTS 8,600,561 B1 * 12/2013 Modi ...................... F24F 11/64
236/46 R
2008/0269955 A1 * 10/2008 Yasui ................... F01N 11/005
700/299

(Continued)

OTHER PUBLICATIONS espec.co.jp, Retrieved on Apr. 16, 2018, from URL: https://www.espec.co.jp/products/env-test/dcth/.

(Continued)

*Primary Examiner* — Nathaniel T Woodward
*Assistant Examiner* — Philip L Cotey
(74) *Attorney, Agent, or Firm* — XSENSUS LLP

(57) ABSTRACT

A calculation apparatus includes a first acquisition unit that acquires a first approximation expression based on a change in a temperature of a temperature controlled member with respect to a change in an outside temperature measured for a plurality of temperatures of a temperature controlling member, a second acquisition unit that obtains a second approximation expression based on the first approximation expression, a temperature input unit that receives input of a first set temperature of the temperature controlled member and a second set temperature of the temperature controlling member, a generation unit that substitutes the second set temperature into the second approximation expression to generate a third approximation expression representing relationship between the outside temperature and the temperature of the temperature controlled member, and a calculation/output unit that substitutes the first set temperature into the third approximation expression to calculate an outside temperature to be set.

15 Claims, 10 Drawing Sheets

(56) References Cited

U.S. PATENT DOCUMENTS

| | | | | |
|---|---|---|---|---|
| 2012/0072032 A1* | 3/2012 | Powell | ................... | F24F 11/30 |
| | | | | 700/278 |
| 2012/0265473 A1* | 10/2012 | Arisaka | ................... | G01K 7/01 |
| | | | | 702/99 |
| 2015/0206776 A1* | 7/2015 | Mimura | ............ | H01L 21/67098 |
| | | | | 165/287 |
| 2015/0338289 A1* | 11/2015 | Friedrichs | ............ | G01K 15/002 |
| | | | | 702/99 |
| 2018/0275697 A1* | 9/2018 | Lichtenegger | ............ | G01F 1/50 |
| 2019/0203963 A1* | 7/2019 | Yoshida | ................... | F24F 11/63 |

OTHER PUBLICATIONS

Masaru Kakegawa et al., Influence of Temperature and Carbonation of Concrete On Rate of Corrosion of Reinforcing Bar in Concrete Containing Chloride Ion, Journal of Structural and Construction Engineering, 2012, pp. 1809-1818, vol. 77, No. 682.

Tatsuhiko Saeki et al, Mechanism of Carbonation and Prediction of Carbonation Process of Concrete, Journal of Structural Mechanics and Earthquake Engineering, 1990, pp. 99-108, vol. 1990, No. 414.

* cited by examiner

CALCULATION DEVICE, CALCULATION METHOD, AND PROGRAM

TECHNICAL FIELD

The present invention relates to a technique for controlling the temperature of a sensor.

BACKGROUND ART

Structures installed outside degrade due to various degradation factors to which the structures are exposed. Thus, to adequately maintain and manage the structures, the degradation of the structures needs to be estimated. The degradation of many structure materials gradually progresses over a long period of time such as few years to few decades, depending on what environment the installed structure is in. Thus, a technology has been reported in which the degradation rate in an outside environment is calculated within a short period of time with the degradation accelerated in a laboratory environment simulating the outside environment (for example, Non Patent Literature 1). Temperature is known as one of the degradation factors of a material. For example, the corrosion rate of rebar has been evaluated in the laboratory environment, using the temperature as a parameter (for example, Non Patent Literature 2).

CITATION LIST

Non Patent Literature

Non Patent Literature 1: Tatsuhiko Saeki et al., "Mechanism of Carbonation and Prediction of Carbonation Process of Concrete", Journal of Japan Society of Civil Engineers, February 1990, Vol. 414/V-12

Non Patent Literature 2: Masaru Kakegawa et al., "Influence of Temperature and Carbonation of concrete on Rate of Corrosion of Reinforcing Bar in Concrete Containing Chloride Ion", Journal of Structural and Construction Engineering, AIJ, December 2012, Vol. 77, No. 682, pp. 1809-1818

Non Patent Literature 3: Espec Corporation, "Dew Cycle Test Chamber", [online], [searched on May 22, 2018], Internet (https://www.espec.co.jp/products/env-test/dcth/)

SUMMARY OF THE INVENTION

Technical Problem

In a laboratory environment, a specimen is evaluated inside a thermostatic tank. In many cases, the temperature may be the same among the thermostatic tank, the specimen, and a sensor for the degradation evaluation. However, for example, for an experimental system relying on a temperature difference between the thermostatic tank and the specimen to produce dew condensation (for example, Non Patent Literature 3), temperature control needs to be performed on the specimen.

For the temperature control on the specimen, a method may be performed by bringing the specimen incorporating a sensor into contact with a temperature controllable member (temperature control portion), as illustrated in FIG. 1, for example, and controlling the temperature of the specimen. Unfortunately, the temperature of the specimen does not reach the temperature of the temperature controlling member, even though a thermally conductive sheet is sandwiched between the temperature control portion and the specimen. Thus, the temperature of the specimen cannot be controlled with high accuracy.

An object of the present disclosure made in view of the above is to provide a calculation apparatus, a calculation method, and a program enabling the temperature of a temperature controlled member to be accurately controlled for performing any test such as a corrosion test, and enabling more accurate test result to be obtained.

Means for Solving the Problem

To achieve the object described above, a calculation apparatus according to the present invention incudes a first acquisition unit configured to acquire, based on a change in a temperature of a temperature controlled member with respect to a change in an outside temperature measured for a plurality of temperatures of a temperature controlling member, a first approximation expression representing a relationship between the outside temperature and the temperature of the temperature controlled member at each of the plurality of temperatures of the temperature controlling member, a second acquisition unit configured to acquire, based on the first approximation expression, a second approximation expression representing a change in one or more coefficients with respect to each of the plurality of temperatures of the temperature controlling member, a temperature input unit configured to receive input of a first set temperature of the temperature controlled member and a second set temperature of the temperature controlling member, a generation unit configured to substitute the second set temperature into the second approximation expression to generate a third approximation expression representing a relationship between the outside temperature and the temperature of the temperature controlled member, and a calculation/output unit configured to substitute the first set temperature into the third approximation expression to calculate an outside temperature to be set.

To achieve the object described above, a calculation method according to the present invention incudes acquiring, by a first acquisition unit, based on a change in a temperature of a temperature controlled member with respect to a change in an outside temperature measured for a plurality of temperatures of a temperature controlling member, a first approximation expression representing a relationship between the outside temperature and the temperature of the temperature controlled member at each of the plurality of temperatures of the temperature controlling member, acquiring, by a second acquisition unit, based on the first approximation expression, a second approximation expression representing a change in one or more coefficients with respect to each of the plurality of temperatures of the temperature controlling member, receiving, by a temperature input unit, input of a first set temperature of the temperature controlled member and a second set temperature of the temperature controlling member, substituting, by a generation unit, the second set temperature into the second approximation expression to generate a third approximation expression representing a relationship between the outside temperature and the temperature of the temperature controlled member, and substituting, by a calculation/output unit, the first set temperature into the third approximation expression to calculate an outside temperature to be set.

Effects of the Invention

With the calculation apparatus, the calculation method, and the program according to the present disclosure, the temperature of a temperature controlled member can be accurately controlled for performing any test such as a corrosion test, for example, and a more accurate test result can be obtained.

DESCRIPTION OF EMBODIMENTS

Hereinafter, the present invention will be described more in detail with reference to the drawings.

Figure 1:
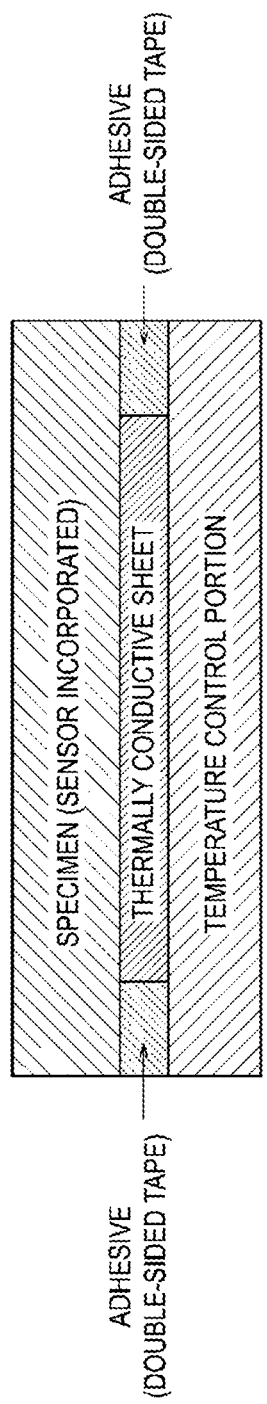
FIG. 1 is a diagram illustrating a conventional temperature control method.
Figure 2:
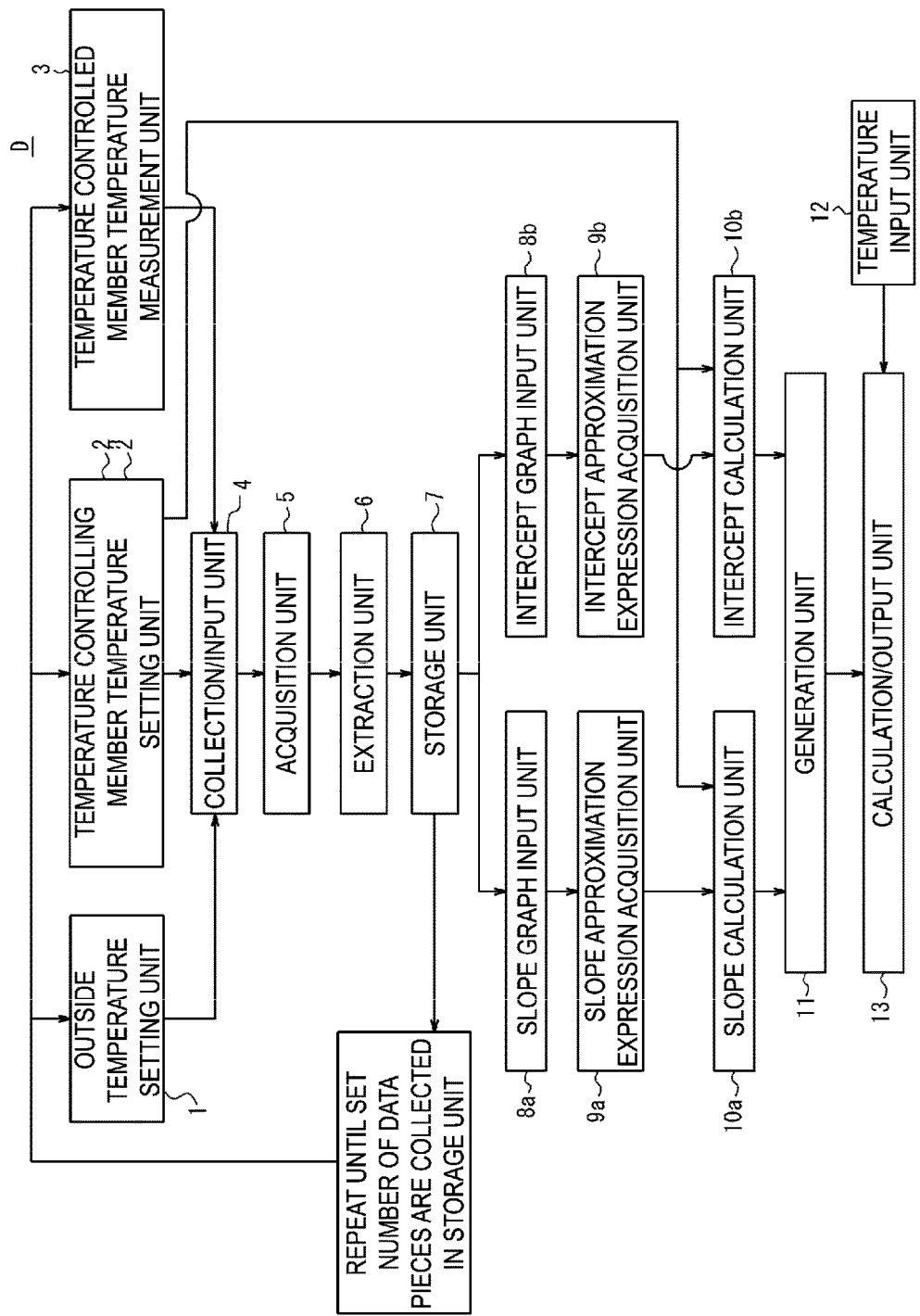
FIG. 2 is a functional block diagram and a flowchart of a calculation apparatus according to a present embodiment.

FIG. 2 is a functional block diagram illustrating a calculation apparatus D according to a present embodiment. The solid lines each indicate the direction in which information flows. The calculation apparatus D includes an outside temperature setting unit 1, a temperature controlling member temperature setting unit 2, a temperature controlled member temperature measurement unit 3, a collection/input unit 4, an acquisition unit 5, an extraction unit 6, a storage unit 7, a slope graph input unit 8a, an intercept graph input unit 8b, a slope approximation expression acquisition unit 9a, an intercept approximation expression acquisition unit 9b, a slope calculation unit 10a, an intercept calculation unit 10b, a generation unit 11, a temperature input unit 12, and a calculation/output unit 13. Hereinafter, the functions of the calculation apparatus D will be described, but the description is not intended to exclude other functions of the calculation apparatus D.

At least one processor (not illustrated), such as a central processing unit (CPU), executes processing executed by the outside temperature setting unit 1, the temperature controlling member temperature setting unit 2, the temperature controlled member temperature measurement unit 3, the collection/input unit 4, the acquisition unit 5, the extraction unit 6, the slope graph input unit 8a, the intercept graph input unit 8b, the slope approximation expression acquisition unit 9a, the intercept approximation expression acquisition unit 9b, the slope calculation unit 10a, the intercept calculation unit 10b, the generation unit 11, and the calculation/output unit 13. The processor may include at least one memory that stores programs for various processes and information during calculation. The memory includes a volatile memory and a nonvolatile memory. The memory includes a memory independent of the processor, and a built-in memory of the processor. The processor includes a general-purpose processor that executes a specific function by causing a specific program to be read, and a dedicated processor that is dedicated to a specific process.

The storage unit 7 includes a semiconductor memory, a magnetic memory, or the like and can store various kinds of information and/or a program for operating the calculation apparatus D, and the like. The storage unit 7 may function also as a work memory.

The temperature input unit 12 is an interface for receiving input from a user, and includes, for example, an operation button (operation key). In another embodiment, the temperature input unit 12 may include a touch panel, and may display an operation key on a part of the temperature input unit 12 to receive touch operation input from the user.

A calculation method performed by the calculation apparatus D will be described below.

Step 1:

An experimental system is composed of three elements including an outside temperature control device, a temperature controlling member, and a temperature controlled specimen. In the present embodiment, all of these three elements are provided in a thermostatic tank, and are in wired or wireless connection with the calculation apparatus D. The temperature controlling member and the temperature controlled specimen are in contact with each other in the present embodiment, but may not be in contact with each other in other embodiments. The outside temperature is controlled by the outside temperature setting unit 1 and the temperature of the temperature controlling member is controlled by the temperature controlling member temperature setting unit 2, as described below, for changing the temperature of the temperature controlled member. The calculation apparatus D uses information collected from the experimental system to perform the calculation described below.

For the sake of convenience of description, the description on the present embodiment will be given with A representing the outside temperature, B representing the temperature of the temperature controlling member, and C representing the temperature of the temperature controlled specimen.

Figure 3:
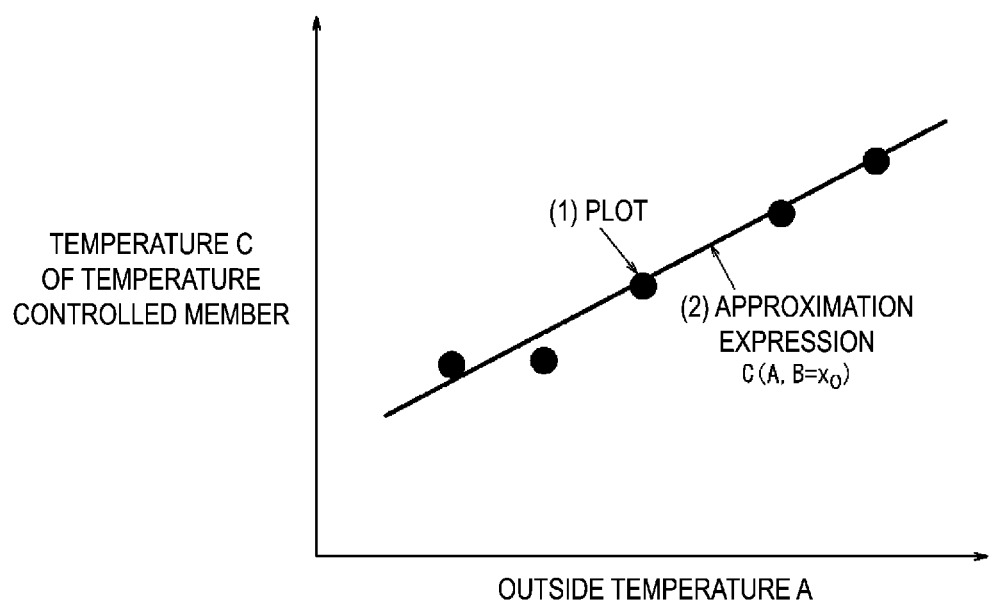
FIG. 3 is an explanatory diagram of step 2 according to the present embodiment.

Step 2:

The outside temperature setting unit 1 and the temperature controlling member temperature setting unit 2 each receive user input and respectively set the outside temperature A and the temperature B of the temperature controlling member. The outside temperature setting unit 1 can set the outside temperature A by changing between two or more values. Here, the temperature controlling member temperature setting unit 2 sets the temperature B of the temperature controlling member to be a fixed value. The temperature controlled member temperature measurement unit 3 measures the temperature C of the temperature controlled specimen. As illustrated in FIG. 3, based on the data obtained in this measurement, the collection/input unit 4 plots a change in temperature of the temperature controlled member with respect to a change in the outside temperature A, with the vertical axis representing the temperature C of the temperature controlled specimen and the horizontal axis representing the outside temperature A (see (1) in FIG. 3). The acquisition unit 5 acquires a first approximation expression corresponding to a line extending through the plotted values (see (2) in FIG. 3). In the present embodiment, for simplicity, the first approximation expression is a linear expression: Y=aX+b, where a and b are constants.

The extraction unit 6 extracts a slope a and an intercept b from the first approximation expression, and stores the slope $a[C(A, B=x_0)]$ and intercept $b[C(A, B=x_0)]$ in the storage unit 7 in association with each other. The storage unit 7 records, as the first approximation expression, an approximation expression $C(A, B=x_0)$ for A—C when the temperature controlling member has the temperature $B=x_0°$ C. In the experiment in step 2, the calculation apparatus D performs measurement while changing the temperature B of the temperature controlling member between a plurality of, that is, two or more temperatures ($x=x_0, x_1, x_2, \ldots$). In this way, the acquisition unit 5 acquires the first approximation expression representing a relationship between the outside temperature A and the temperature C of the temperature controlled member, at each temperature of the temperature controlling member. The calculation apparatus D may obtain the first approximation expression by changing the temperature B of the temperature controlling member until a predetermined number of data pieces are collected. Note that the acquisition unit 5 corresponds to a first acquisition unit of the present invention.

Figure 4A:
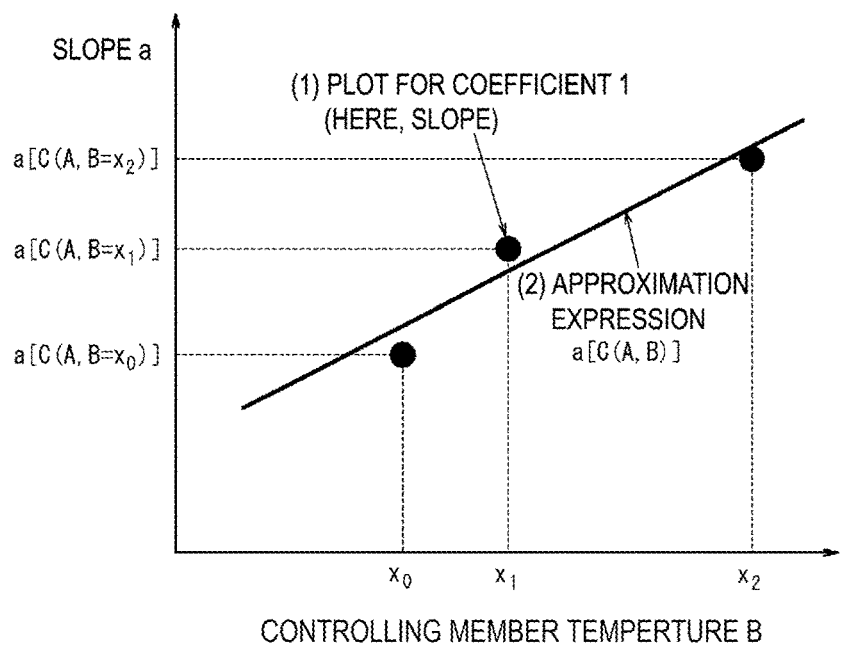
FIG. 4A is an explanatory diagram of a slope in step 3 according to the present embodiment.
Figure 4B:
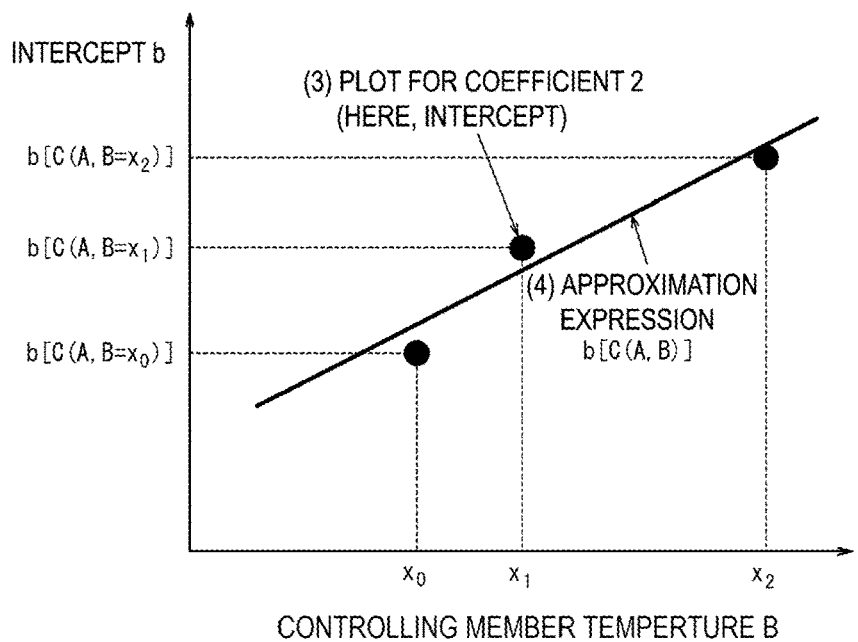
FIG. 4B is an explanatory diagram of an intercept in step 3 according to the present embodiment.

Step 3:

As illustrated in FIG. 4A, the slope graph input unit 8a plots coefficients obtained for the respective temperatures B ("Slope $a[C(A, B=x_0)], a[C(A, B=x_1)], \ldots$" (see (1) in FIG. 4A). This slope corresponds to a rate of change in the temperature C of the temperature controlled member to the change in the outside temperature A, according to the present invention. The slope approximation expression acquisition unit 9a obtains an approximation expression based on the plot (see (2) in FIG. 4A). The present embodiment uses, as an example, a linear expression for the approximation expression. On the other hand, as illustrated in FIG. 4B, the intercept graph input unit 8b plots coefficients obtained for the respective temperatures B (intercept $b[C(A, B=x_0)], b[C(A, B=x_1)], \ldots$) (see (3) in FIG. 4B). This intercept is the value of the temperature C of the temperature controlled member when the outside temperature A is zero, according to the present invention. The intercept approximation expression acquisition unit 9b obtains an approximation expression based on the plot (see (4) in FIG. 4B). The present embodiment uses, as an example, a linear expression for the approximation expression.

As described above, in step 3, the slope approximation expression acquisition unit 9a and the intercept approximation expression acquisition unit 9b acquire, on the basis of the first approximation expression, the approximation expressions indicating changes in the slope and the intercept with respect to a change in the temperature B of the temperature controlling member. Here, the slope and the intercept are elements included in the coefficients of the present invention. The approximation expressions acquired by the slope approximation expression acquisition unit 9a and the intercept approximation expression acquisition unit 9b correspond to a second approximation expression according to the present invention. The slope approximation expression acquisition unit 9a and the intercept approximation expression acquisition unit 9b correspond to a second acquisition unit according to the present invention.

Figure 5A:
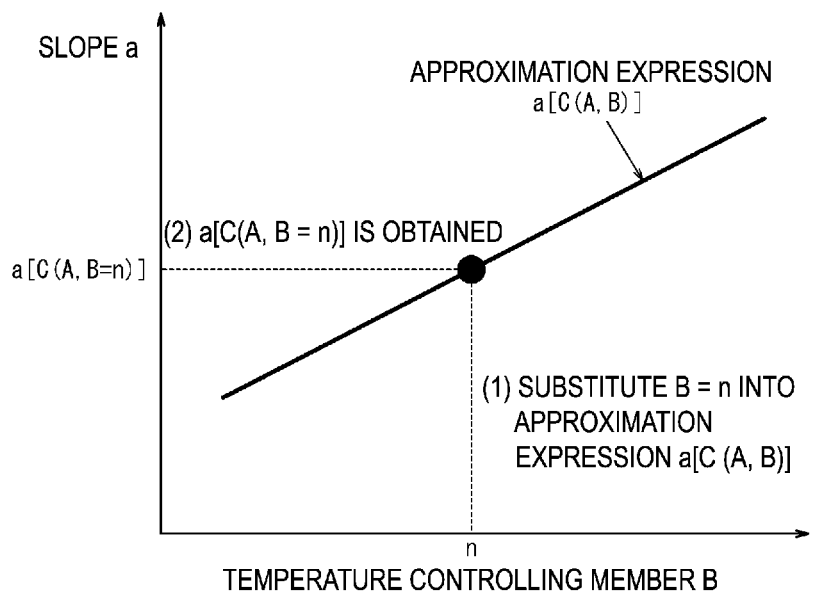
FIG. 5A is an explanatory diagram of a slope in step 4 according to the present embodiment.
Figure 5B:
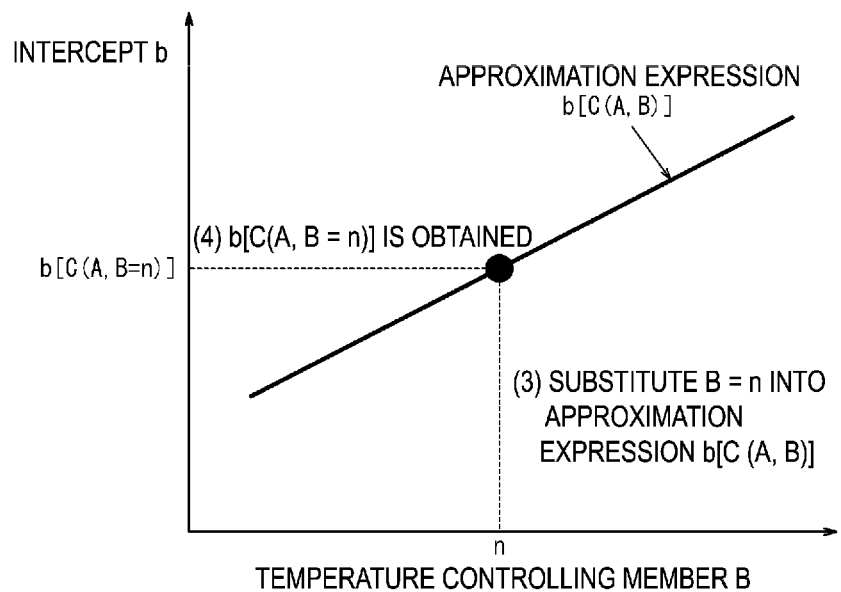
FIG. 5B is an explanatory diagram of an intercept in step 4 according to the present embodiment.

Step 4:

The user of the calculation apparatus D sets the temperature B of the temperature controlling member as a second set temperature. For the sake of convenience of description, the description on the present embodiment is given with the temperature B referred to as n° C. When the temperature input unit 12 receives the temperature B input from the user, the slope calculation unit 10a and the intercept calculation unit 10b each substitute the temperature B=n into the corresponding one of the "slope $a[C(A, B)])$" and the "intercept $b[C(A, B)]$" as illustrated in FIGS. 5A and 5B (see (1) in FIG. 5A and (3) in FIG. 5B), to obtain the corresponding one of the coefficients (slope $a[C(A, B)=n]$ and intercept $b[C(A, B)=n]$) in the approximation expression when the temperature B is n° C. (see (2) in FIG. 5A and (4) in FIG. 5B).

The user of the calculation apparatus D sets the temperature C of the temperature controlled specimen as the first set temperature. For the sake of convenience of description, the description on the present embodiment is given with the temperature C referred to as m° C. When the temperature input unit 12 receives the temperature C input from the user, the generation unit 11 substitutes the slope $a[C(A, B=n)]$ and intercept $b[C(A, B=n)]$ as calculated above into the second approximation expression $C(A, B)$ obtained with the temperature controlling member being n° C. As a result, the generation unit 11 generates a third approximation expression $C=\{a[C(A, B=n)]\}A+\{b[C(A, B=n)]\}$ indicating the relationship between the outside temperature A and the temperature C of the temperature controlled member. Next, the calculation/output unit 13 substitutes the set temperature C=m into the third approximation expression generated by the generation unit 11, to solve the third approximation expression for A as follows.

$$A = \frac{(C = m) - \{b[C(A, B = n)]\}}{\{a[C(A, B = n)]\}} \quad \text{[Math. 1]}$$

The calculation/output unit 13 outputs the outside temperature A to be set as calculated above by using a predetermined method. This predetermined method includes sound, display, and the like. By setting the outside temperature A° C. and the temperature controlling member n° C. thus obtained in the actual experimental system, the user of the calculation apparatus D can control the temperature of the temperature controlled specimen to m° C.

Note that in the present embodiment, the calculation apparatus D fixes the temperature B of the temperature controlling member in step 2, and then determines the set temperature B of the temperature controlling member in step 4, to obtain the outside temperature A. Alternatively, in a case where the user wants to determine the set temperature of the outside temperature in step 4 and obtain the set temperature B of the temperature controlling member, the calculation apparatus D may set the outside temperature A to be a fixed value in step 2.

Confirmatory Experiment

In order to confirm whether the calculation method described above actually works, a confirmatory experiment was performed as follows. For simplicity of explanation, the description already given above will be omitted.

Figure 6:
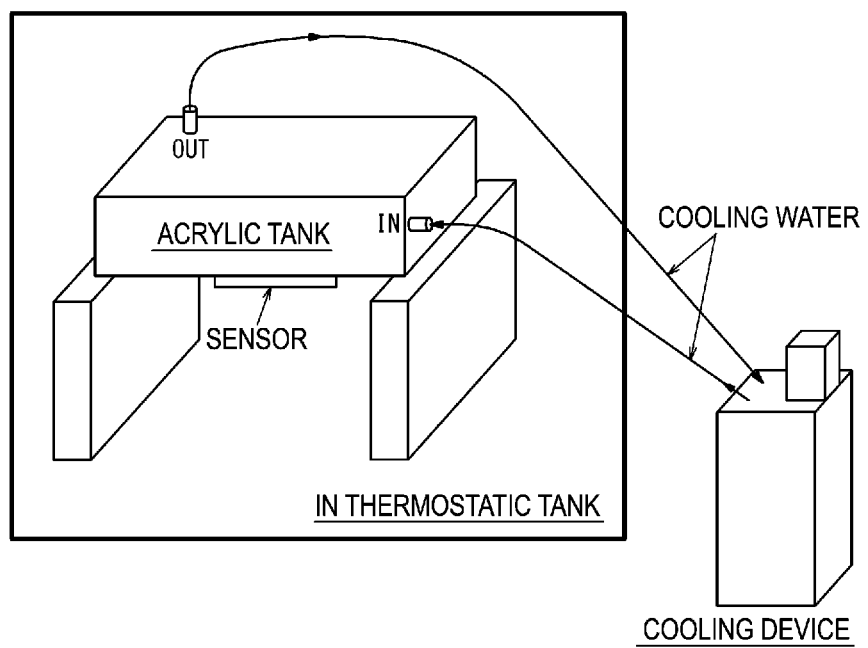
FIG. 6 is a schematic diagram of an experimental system according to the present embodiment.

Step 1:

In this experimental system, a thermostatic tank, a cooling device and an acrylic tank, and a sensor respectively serve as the outside temperature control device, the temperature controlling member, and the temperature controlled specimen. FIG. 6 illustrates an overview of the experimental system. The temperature within the thermostatic tank can be controlled as desired. The cooling device releases cooling water and injects the cooling water into the acrylic tank from an opening denoted by "IN" in FIG. 6. In this manner, the cooling device can control the temperature of the acrylic tank. The water in the acrylic tank is released from an opening denoted by "OUT" in FIG. 6, to return to the cooling device.

Figure 7:
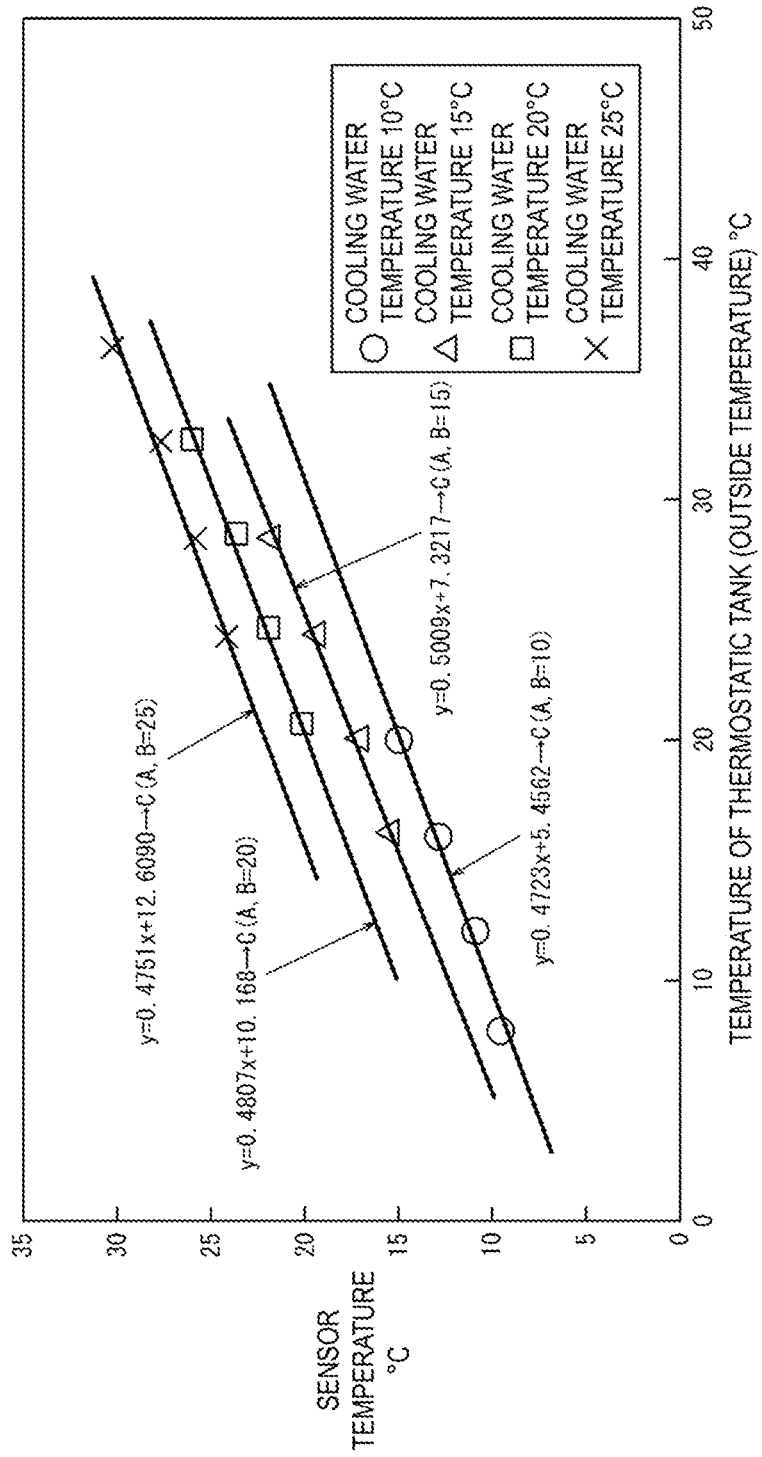
FIG. 7 is a diagram illustrating an example of an approximation expression for a sensor temperature according to the present embodiment.

Step 2:

The temperature controlling member temperature setting unit 2 set the temperature of the cooling device constantly to 10° C. The outside temperature setting unit 1 set the set temperature of the thermostatic tank while changing the temperature among 8, 12, 16, and 20° C. The temperature controlled member temperature measurement unit 3 measured the temperature of the sensor at each of these temperatures. The collection/input unit 4 plotted the resultant data into a graph, as illustrated in FIG. 7. In the present embodiment, the plot was approximated by a linear function. Thus, the acquisition unit 5 of the present embodiment obtained the approximation expression as a linear expression. The extraction unit 6 set the slope and intercept, as the coefficients of the linear expression, to "a[C(A, B=10)]" and "b[C(A, B=10)]", extracted 0.47 and 5.46 respectively, and recorded these values in the storage unit 7 in association with each other. In the present experiment, humidity was kept constant at 80%, for example. Note that a difference between the set temperature of the thermostatic tank and the actual temperature would not be a problem in the present experiment as long as the actual temperature is recognized.

Step 3:

The calculation apparatus D changed the temperature of the cooling apparatus to each of 15, 20, and 25° C., as well as 10° C. described above, to execute the processing in step 2 described above four times in total. Thus, the calculation apparatus D additionally obtained "a[C(A, B=15)]" and "b[C(A, B=15)]", "a[C(A, B=20)]" and "b[C(A, B=20)]", and "a[C(A, B=25)]" and "b[C(A, B=25)]". The slope graph input unit 8a and the intercept graph input unit 8b plotted each of the slopes and intercepts obtained into a graph. FIG. 7 illustrates the approximation expressions "C(A, B)=10", "C(A, B)=15", "C(A, B)=20", and "C(A, B)=25" obtained in steps 2 and 3. Table 1 below illustrates the temperature of the thermostatic tank and the sensor temperature corresponding to each of the cooling water temperatures, as well as the slope and the intercept of the approximation expressions obtained.

The values in parentheses in the row of the thermostatic tank temperature A in Table 1 above are the set temperatures of the thermostatic tank. In some cases, a difference was found between the set temperature and the actually measured temperature. In the present experiment, the calculation apparatus D used the actually measured temperature.

Figure 8:
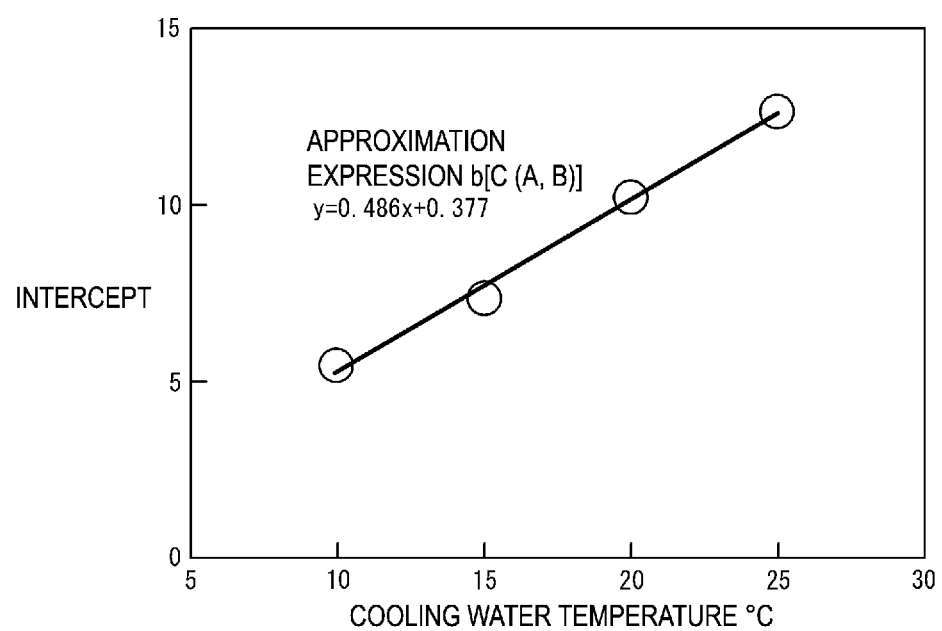
FIG. 8 is a diagram illustrating an example of an approximation expression for an intercept according to the present embodiment.

FIG. 8 illustrates the approximation expression "b[C (A, B)]" obtained by the intercept approximation expression acquisition unit 9b. On the other hand, the slope approximation expression acquisition unit 9a obtained "a[C(A, B)]". In the present experiment, every slope value for all cooling water temperatures was within a predetermined range, and thus the slope calculation unit 10a calculated 0.482, which is the average value of "a[C(A, B)]", as the slope.

Figure 9:
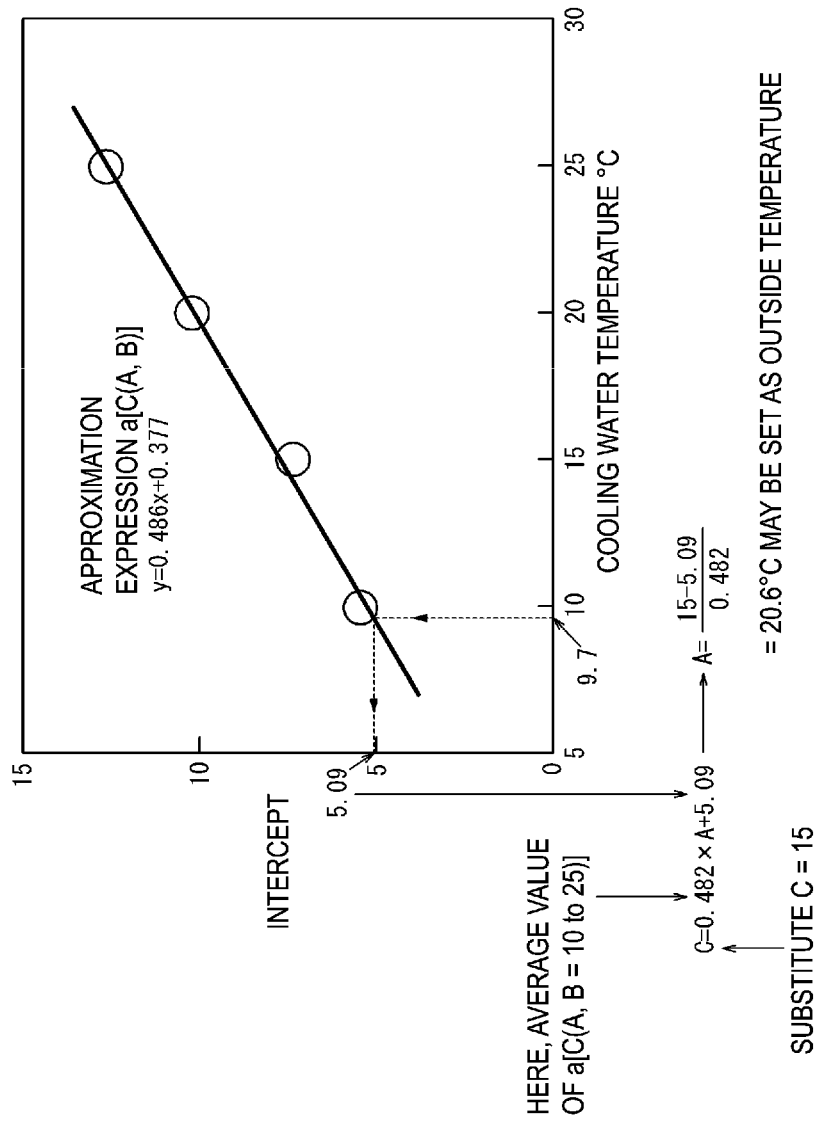
FIG. 9 is a diagram illustrating a method for obtaining an outside temperature according to the present embodiment.

Step 4:

The objective of the present experiment was to control the sensor temperature C to be 15° C. when the cooling water temperature x is 9.7° C. Thus, the generation unit 11 substituted x=9.7 into "b[C(A, B)], that is, y=0.486x+0.377", to obtain y=approximately 5.09 (see FIG. 9). Thus, by substituting the obtained value, "C={a[C(A, B=n)]}A+{b[C(A, B=n)]}" is derived as C=0.482×A+5.09. In response to the reception of C=15° C. by the temperature input unit 12, the calculation/output unit 13 substituted C=15° C. into the above expression to obtain the outside temperature A=approximately 20.6° C. The calculation/output unit 13 outputted the outside temperature thus obtained. As described above, through the present experiment, setting the thermostatic tank temperature to 20.6° C., and the cooling water temperature to 9.7° C. was found as one method for a case where the user wants to control the sensor temperature to be 15° C. The following Table 2 illustrates the temperatures of the thermostatic tank and the cooling water thus obtained for the total of five patterns, for the objective of controlling the sensor temperature to be 15° C.

TABLE 2

| Thermostatic tank temperature | 20.6 | 20.1 | 19.5 | 19.0 | 18.5 |
|---|---|---|---|---|---|
| Cooling water temperature | 9.7 | 10.2 | 10.8 | 11.3 | 11.7 |

TABLE 1

| COOLING WATER TEMPERATURE B | THERMOSTATIC TANK TEMPERATURE A | SENSOR TEMPERATURE C | SLOPE a[C(A, B = 10-25)] | INTERCEPT B[C(A, B = 10-25)] |
|---|---|---|---|---|
| 10 | 8 | 9.6 | 0.47 | 5.46 |
|  | 12.1(12) | 10.9 |  |  |
|  | 16 | 12.9 |  |  |
|  | 20 | 15.1 |  |  |
| 15 | 16.2(16) | 15.5 | 0.50 | 7.32 |
|  | 20.1(20) | 17.1 |  |  |
|  | 24.4(24) | 19.4 |  |  |
|  | 28.5(28) | 21.8 |  |  |
| 20 | 20.7(20) | 20.1 | 0.48 | 10.7 |
|  | 24.7(24) | 21.9 |  |  |
|  | 28.7(28) | 23.6 |  |  |
|  | 32.5(32) | 26.1 |  |  |
| 25 | 24.3(24) | 24 | 0.48 | 12.7 |
|  | 28.4(28) | 25.8 |  |  |
|  | 32.4(32) | 27.6 |  |  |
|  | 36.3(36) | 30.2 |  |  |

Figure 10:
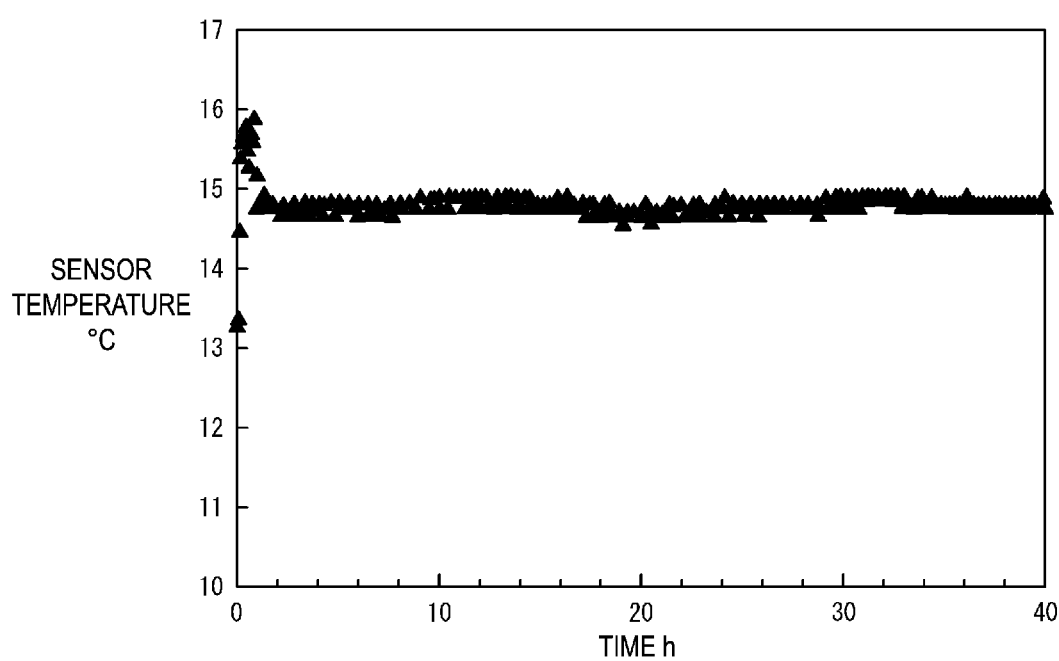
FIG. 10 is a diagram illustrating a control result according to the present embodiment.

When the temperature of the thermostatic tank was actually set to each of the temperatures listed in Table 2 to conduct the experiment for 40 hours, the sensor temperature was controlled to be approximately 15° C. for all five patterns. FIG. 10 illustrates the transition of the sensor temperature, in a representative case where the thermostatic tank temperature is 20.6° C. and the cooling water temperature is 9.7° C. In FIG. 10, the sensor temperature is deviated from 15° C. because the thermostatic tank temperature is slightly deviated from 20.6° C. which is a set value.

As described above, according to the present embodiment, by obtaining the correlation among the total of three temperatures (the temperature in the thermostatic tank, the temperature of the temperature controlling member, and the temperature of the specimen (sensor)) and using the correlation for an inverse operation, the calculation apparatus D can obtain the experiment condition (the temperature of the thermostatic tank and the temperature of the temperature controlling member, for example) which the user (such as an experimenter) desires to set. Thus, the calculation apparatus D can accurately control the temperature of the temperature controlled member for performing a certain test such as a corrosion test, without requiring the experimenter to go through trial and error to obtain the test condition. The temperature of the temperature controlled member can be controlled even when the temperature is different from the temperature in the thermostatic tank.

According to the present embodiment, one or more coefficients include a rate of a change in the temperature C of the temperature controlled member to a change in the outside temperature A at each temperature of the temperature controlling member, and include a value of the temperature C of the temperature controlled member when the outside temperature A is 0. Thus, by setting a specific parameter, the calculation apparatus D can control the temperature of the temperature controlled member more accurately.

According to the present embodiment, the acquisition unit 5 acquires the first approximation expression by changing the temperature B of the temperature controlling member until a predetermined number of data pieces is collected. Thus, with the sufficient amount of data, the calculation apparatus D can more accurately control the temperature of the temperature controlled member.

According to the present embodiment, the first approximation expression and the second approximation expression are linear expressions. This means that the approximation expressions can be simplified, and thus the calculation apparatus D can simply control the temperature of the temperature controlled member.

The embodiment described above is one example. It is apparent to those skilled in the art that many changes and substitutions can be made to the embodiment within the spirit and the scope of the invention. Therefore, the present disclosure should not be construed as being limited by the embodiment described above, and various modifications and changes can be made without departing from the claims. For example, a plurality of constituent blocks illustrated in the configuration diagram according to the embodiment may be combined into one block, or one constituent block may be divided.

The apparatus according to the present invention can also be realized by a computer and a program, and can also record a program in a recording medium and provide a program through a network. In a case in which the calculation apparatus D includes a computer, for example, the computer may be caused to function by storing a program describing details of the processing enabling each function in a storage unit disposed inside or outside the computer and reading and executing the program using a central processing unit (CPU) of the computer. Such a program can be distributed by, for example, selling, transferring, or renting a portable recording medium such as a DVD or a CD-ROM, and also can be distributed by storing the program, for example, in a storage unit of a server present on a network and transmitting the program from the server to another computer via the network. In addition, for example, a computer executing such a program may temporarily store a program recorded on a portable recording medium or a program transferred from a server in its own storage unit. Furthermore, as another aspect of this program, a computer may directly read a program from a portable recording medium, and execute processing in accordance with the program. Furthermore, each time a program is transferred from a server to the computer, processing in accordance with the program received may be sequentially executed.

REFERENCE SIGNS LIST

D Calculation apparatus
1 Outside temperature setting unit
2 temperature controlling member temperature setting unit
3 Temperature controlled member temperature measurement unit
4 Collection/input unit
5 Acquisition unit
6 Extraction unit
7 Storage unit
8a Slope graph input unit
8b Intercept graph input unit
9a Slope approximation expression acquisition unit
9b Intercept approximation expression acquisition unit
10a Slope calculation unit
10b Intercept calculation unit
11 Generation unit
12 Temperature input unit
13 Calculation/output unit

The invention claimed is:
1. A calculation apparatus comprising:
a memory; and
a processor coupled to the memory and configured to:
acquire, based on a change in a temperature of a temperature controlled member with respect to a change in a temperature of thermostatic tank measured for a plurality of temperatures of a temperature controlling member, a first approximation expression representing a relationship between the temperature of the thermostatic tank and the temperature of the temperature controlled member at each of the plurality of temperatures of the temperature controlling member, the temperature controlled member and the temperature controlling member being disposed in the thermostatic tank, the temperature of the thermostatic tank being a temperature of a volume within the thermostatic tank excluding the temperature of the temperature controlled member and the temperature of the temperature controlling member;
acquire, based on the first approximation expression, a second approximation expression representing a change in one or more coefficients with respect to each of the plurality of temperatures of the temperature controlling member;

receive input of a first set temperature of the temperature controlled member and a second set temperature of the temperature controlling member;

substitute the second set temperature into the second approximation expression to generate a third approximation expression representing a relationship between the temperature of the thermostatic tank and the temperature of the temperature controlled member; and substitute the first set temperature into the third approximation expression to calculate a thermostatic tank temperature to be set.

2. The calculation apparatus according to claim 1, wherein the one or more coefficients include a rate of the change in the temperature of the temperature controlled member to the change in the temperature of the thermostatic tank, at each of the plurality of temperatures of the temperature controlling member.

3. The calculation apparatus according to claim 1, wherein the one or more coefficients include a value of the temperature of the temperature controlled member when the temperature of the thermostatic tank is 0, at each of the plurality of temperatures of the temperature controlling member.

4. The calculation apparatus according to claim 1, wherein the processor acquires the first approximation expression by changing the plurality of temperatures of the temperature controlling member until a predetermined number of data pieces are collected.

5. The calculation apparatus according to claim 1, wherein the first approximation expression is a linear expression.

6. The calculation apparatus according to claim 5, wherein the second approximation is based on at least:

an approximation of a change in a slope of the first approximation with respect to the plurality of temperatures of the temperature controlling member, and an approximation of a change in an intercept of the first approximation with respect to the plurality of temperatures of the temperature controlling member.

7. The calculation apparatus according to claim 6, further comprising:

a user interface configured to receive the first set temperature and the second set temperature.

8. The calculation apparatus according to claim 7, wherein the user interface includes an operation button to receive the first set temperature and the second set temperature.

9. The calculation apparatus according to claim 8, wherein the user interface includes a display to display the operation button and touch panel to receive the first set temperature and the second set temperature.

10. The calculation apparatus according to claim 9, wherein the temperature controlling member includes a cooling device.

11. The calculation apparatus according to claim 10, wherein the temperature controlled member includes an acrylic tank.

12. The calculation apparatus according to claim 11, wherein the cooling device injects water into the acrylic tank to control a temperature of the acrylic tank.

13. The calculation apparatus according to claim 1, wherein the second approximation expression is a linear expression.

14. A calculation method comprising:

acquiring, by a processor, based on a change in a temperature of a temperature controlled member with respect to a change in a temperature of a thermostatic tank measured for a plurality of temperatures of a temperature controlling member, a first approximation expression representing a relationship between the outside temperature and the temperature of the temperature controlled member at each of the plurality of temperatures of the temperature controlling member, the temperature controlled member and the temperature controlling member being disposed in the thermostatic tank, the temperature of the thermostatic tank being a temperature of a volume within the thermostatic tank excluding the temperature of the temperature controlled member and the temperature of the temperature controlling member;

acquiring, by the processor, based on the first approximation expression, a second approximation expression representing a change in one or more coefficients with respect to each of the plurality of temperatures of the temperature controlling member;

receiving, by the processor, input of a first set temperature of the temperature controlled member and a second set temperature of the temperature controlling member;

substituting, by the processor, the second set temperature into the second approximation expression to generate a third approximation expression representing a relationship between the temperature of the thermostatic tank and the temperature of the temperature controlled member; and substituting, by the processor, the first set temperature into the third approximation expression to calculate a thermostatic tank temperature to be set.

15. A non-transitory computer-readable medium encoded with computer-readable instructions that, when executed by a computer, cause the computer to perform a method according to claim 14.

* * * * *